United States Patent
Pellegrini

(10) Patent No.: US 6,171,208 B1
(45) Date of Patent: Jan. 9, 2001

(54) DEVICE FOR TENSIONING FLEXIBLE ELEMENTS WOUND ONTO PULLEYS

(75) Inventor: Marco Terzo Pellegrini, Illasi (IT)

(73) Assignee: Pellegrini Meccanica S.p.A., Verona (IT)

( * ) Notice: Under 35 U.S.C. 154(b), the term of this patent shall be extended for 0 days.

(21) Appl. No.: 09/237,868

(22) Filed: Jan. 27, 1999

(51) Int. Cl.$^7$ ................................ F16H 7/10; F16H 7/12
(52) U.S. Cl. ..................... 474/112; 474/138; 474/136
(58) Field of Search ................................ 474/901, 900, 474/242, 161, 165, 167, 168, 138, 136, 164, 162–163, 117, 101, 112; 305/143, 144, 145, 146, 155, 156; 74/527

(56) References Cited

U.S. PATENT DOCUMENTS

| | | | |
|---|---|---|---|
| 1,514,158 | * 11/1924 | Holt | 474/138 X |
| 4,791,869 | * 12/1988 | Furukawa | 474/900 X |
| 4,832,665 | * 5/1989 | Kadota et al. | 474/112 |
| 5,266,067 | * 11/1993 | Gapco | 474/135 X |
| 5,366,417 | * 11/1994 | Shimaya | 474/112 |

FOREIGN PATENT DOCUMENTS

| | | | |
|---|---|---|---|
| 2746305 | * | 4/1978 | (DE) . |
| 2282581 | * | 3/1934 | (FR) . |
| 411989 | * | 6/1934 | (GB) . |

* cited by examiner

Primary Examiner—David A. Bucci
Assistant Examiner—Marcus Charles
(74) Attorney, Agent, or Firm—Browdy and Neimark

(57) ABSTRACT

A device for tensioning flexible elements wound onto pulley has a pulley (4) onto which the flexible element (2) is (partially) wound is able to perform translatory movements relative and perpendicular to the shaft (8) on which it is rotatably mounted, respectively between an advanced position, where minimum tensioning of the flexible element (2) associated with the pulley (4) occurs, and a retracted position, where maximum tensioning of the flexible element (2) occurs, tensioning means being provided in order to cause said translatory movements of the pulley (4) with respect to the shaft (8).

10 Claims, 6 Drawing Sheets

DEVICE FOR TENSIONING FLEXIBLE ELEMENTS WOUND ONTO PULLEYS

BACKGROUND OF THE INVENTION

1. Field of the Invention

The present invention relates to a device for tensioning flexible elements wound onto pulleys, such as, for example, belts, cables, drive chains or also flexible elements having the function of tools, such as diamond-coated wires used in the stone-processing sector in machines for cutting marble, granite or other stone materials.

Although the present invention may find an application in numerous sectors of the art, below for the sake of simplicity of the description, specific reference will be made to the sector of machines for cutting stone materials, as mentioned above.

2. Description of the Prior Art

In this sector, for many years machines which use a diamond-coated wire have been known, said wire being mounted endlessly on two pulleys (i.e. a driving pulley and a driven pulley, called "flywheels") and, moving at high speed, being used to cut blocks or slabs of marble or granite.

The problems of tensioning the diamond-coated wire are solved, in these machines, usually by displacing the flywheel-carrying shaft (i.e. the driven shaft) with the aid of suitable moving means which are mainly hydraulic. Smaller tensioning flywheels may also be provided.

In recent years machines for producing slabs have been provided, said machines using several diamond-coated wires which are mounted on flywheels with multiple races or using a single wire which is made to pass over a multiplicity of flywheels so as to create a situation where there is a multiplicity of parallel cutting planes. Again in recent years, machines for producing slabs have been developed, said machines using a multiplicity of single diamond-coated wires which are wound endlessly onto a corresponding multiplicity of pairs of flywheels, where the adjacent flywheels are arranged very close to one another.

The problems of tensioning the diamond-coated wire in these types of machines at present have been only partially overcome or have not been overcome at all. In the case of flywheels with multiple races, tensioning is performed in a manner similar to that used in traditional single-wire machines as mentioned above. In the case of machines using multiple flywheels, the tensioning system of the known type envisages that all the driven flywheels on which the wire is partially wound are tensioned simultaneously.

This type of tensioning performed in an identical manner and simultaneously on all the flywheels may give rise to problems, some of which are serious. In particular in the following cases:

- if the diameters of the flywheels are even only slightly different from those of the similar adjacent flywheels. In fact, in this case, there would be undesirable wear of the wire or deformation thereof, due to friction;
- if the length of the wires differs, even only slightly, from wire to wire;
- if the tensioning displacement of the group of flywheels is not perfectly parallel to itself;
- if the flywheel-carrying shaft has a camber, even of a small degree, due to the weight of the flywheels themselves, and to the load applied.

Taking into account these drawbacks, the technical problem to be solved is that of being able to perform individual and separate tensioning for each flywheel and moreover with extremely small dimensions (so that the flywheels may be arranged next to one another at a distance as required—this being the factor which determines the thickness of the slabs cut by the wire).

SUMMARY OF THE INVENTION

The main object of the present invention is therefore that of overcoming the drawbacks of the known art by solving the technical problem indicated above. Another object of the invention is that of providing a constructionally simple, reliable and low-cost tensioning device.

These and other objects are all achieved by the tensioning device in question, the main features of which are described in the claims which follow.

BRIEF DESCRIPTION OF THE DRAWINGS

Further characteristic features and advantages of the invention will emerge more clearly from the detailed description which follows, of a few embodiments of the device in question, provided purely by way of a non-limiting example in the accompanying drawings, with reference to the stone-processing sector, in which.

DETAILED DESCRIPTION OF THE PREFERRED EMBODIMENTS

With reference to the accompanying figures, 1 denotes a block of stone to be cut into parallel slabs.

The cut is performed by a machine (substantially of a known type and therefore not described in detail), in which a plurality of diamond-coated wires 2 parallel to one another are endlessly mounted on a corresponding multiplicity of pairs of flywheels 3 and 4 (driving pulleys and driven pulleys). The diamond-coated wires 2, owing to their high speed of movement, perform the parallel cuts 1 in the block 1 according to a technique known per se.

Figure 1:
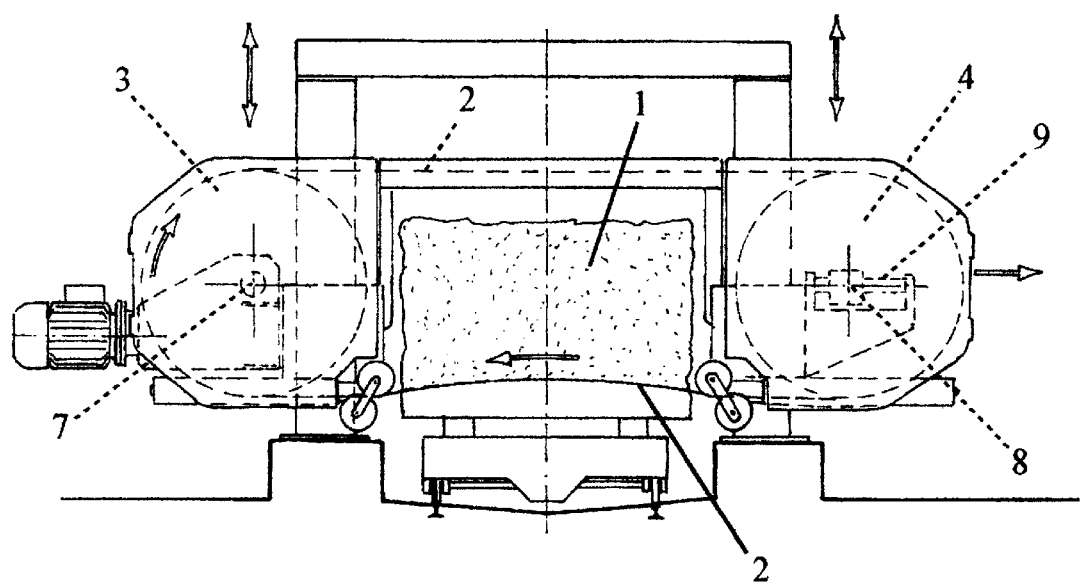
FIG. 1 shows a multiple-wire machine for cutting stone blocks.
Figure 2:
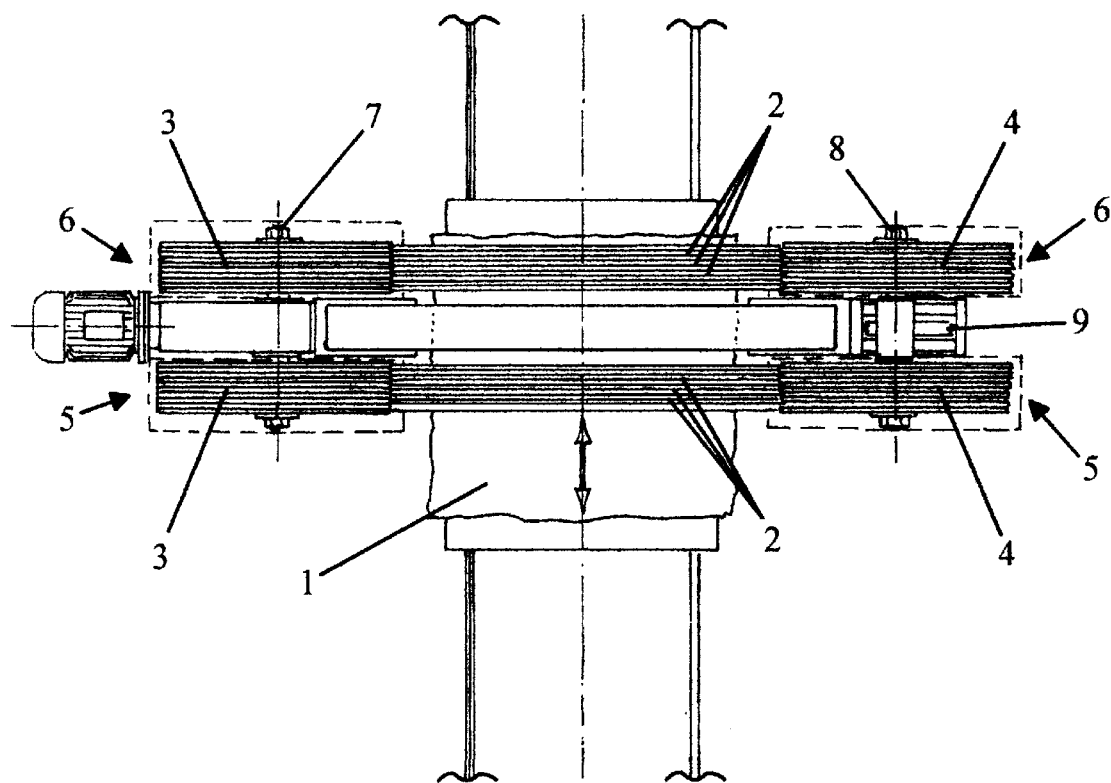
FIG. 2 is a plan view of the machine according to FIG. 1.

FIGS. 1 and 2 show one of these machines, in particular provided with two groups 5 and 6 of diamond--coated wires 2, in which both the driving flywheels 3, which are parallel to one another, and the idle flywheels 4, which are also parallel to one another, are mounted respectively on a single driving shaft 7 and a single driven shaft 8.

Still with reference to FIGS. 1 and 2, it can be noted that a so-called "rough" tensioning member is provided, said member consisting, in a manner known per se, of a hydraulic cylinder 9 associated with the driven shaft 8 which allows all the wires 2 of the groups 5 and 6 mounted on the flywheels 4 to be tensioned simultaneously.

A so-called "fine" tensioning device is also envisaged, said device (forming the subject of the present invention), being associated with each individual flywheel which allows tensioning, in a specific manner, of the wire 2 mounted on this flywheel 4.

Figure 6:
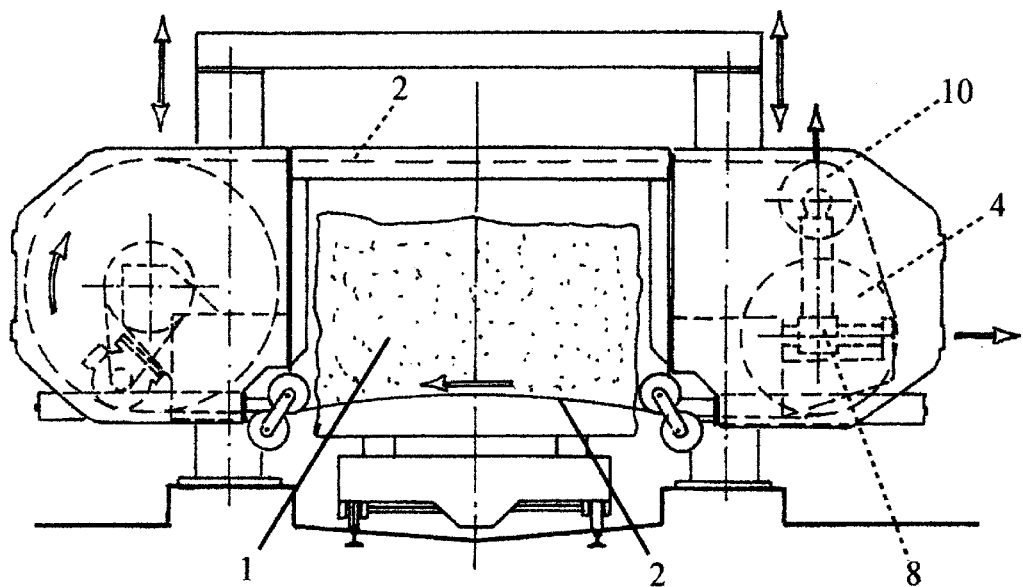
FIG. 6 shows a multiple-wire machine where the (fine) tensioning device in question is applied to smaller-diameter tensioning pulleys, while traditional (rough) tensioning is performed by the drive pulleys (or flywheels)

In the example shown in FIG. 6, the so-called traditional "rough" tensioning is performed by the shaft 8 which is made to perform a translatory movement by the hydraulic cylinder 9. The "fine" tensioning is performed by small individual tensioning flywheels which, in the example according to FIG. 6, are positioned above the idle flywheels 4.

Figure 7:
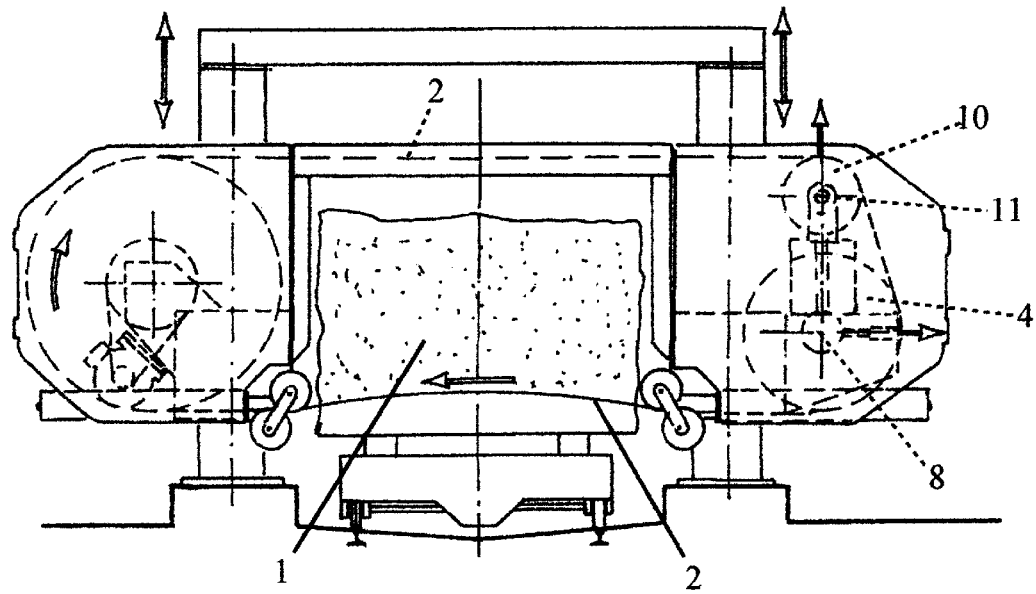
FIG. 7 shows a multiple-wire machine in which the (fine) tensioning device in question is applied to the drive pulleys (or flywheels), while traditional (rough) tensioning is performed by smaller-diameter tensioning pulleys.

On the other hand, in the example shown in FIG. 7, the "fine" tensioning is performed by the individual flywheels 4, while the traditional "rough" tensioning is performed by displacing the shaft 11 of the small tensioning flywheels 10.

Figure 4:
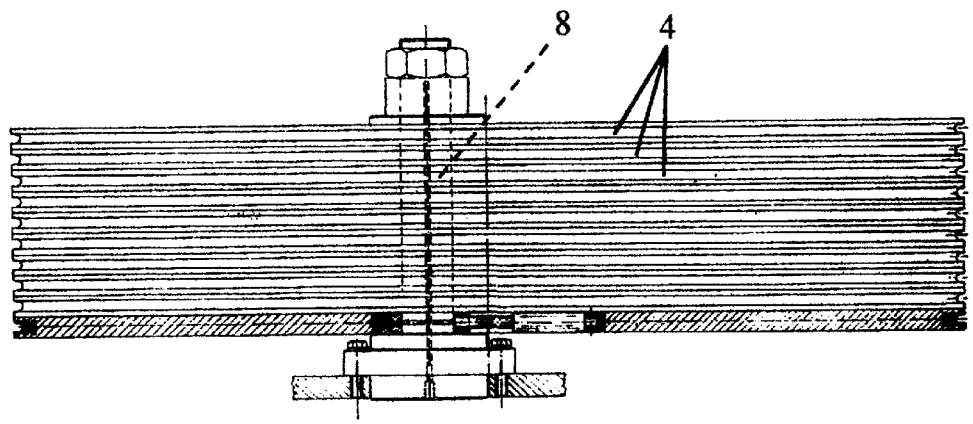
FIG. 4 is a plan view of the group of pulleys (or flywheels) according to FIG. 3.
Figure 3:
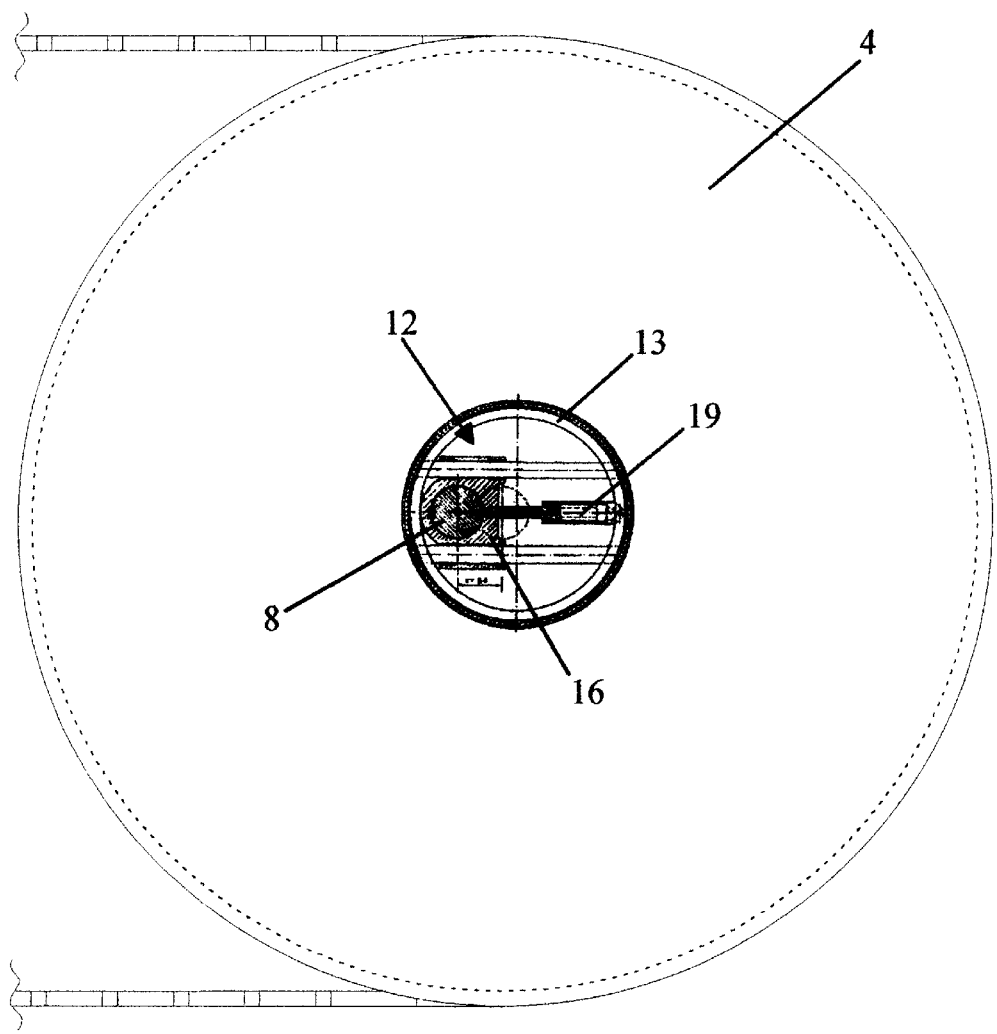
FIG. 3 shows a side view of a pulley (or flywheel) provided with a tensioning device in question (without protective casing) in a first preferred embodiment thereof.
Figure 5:
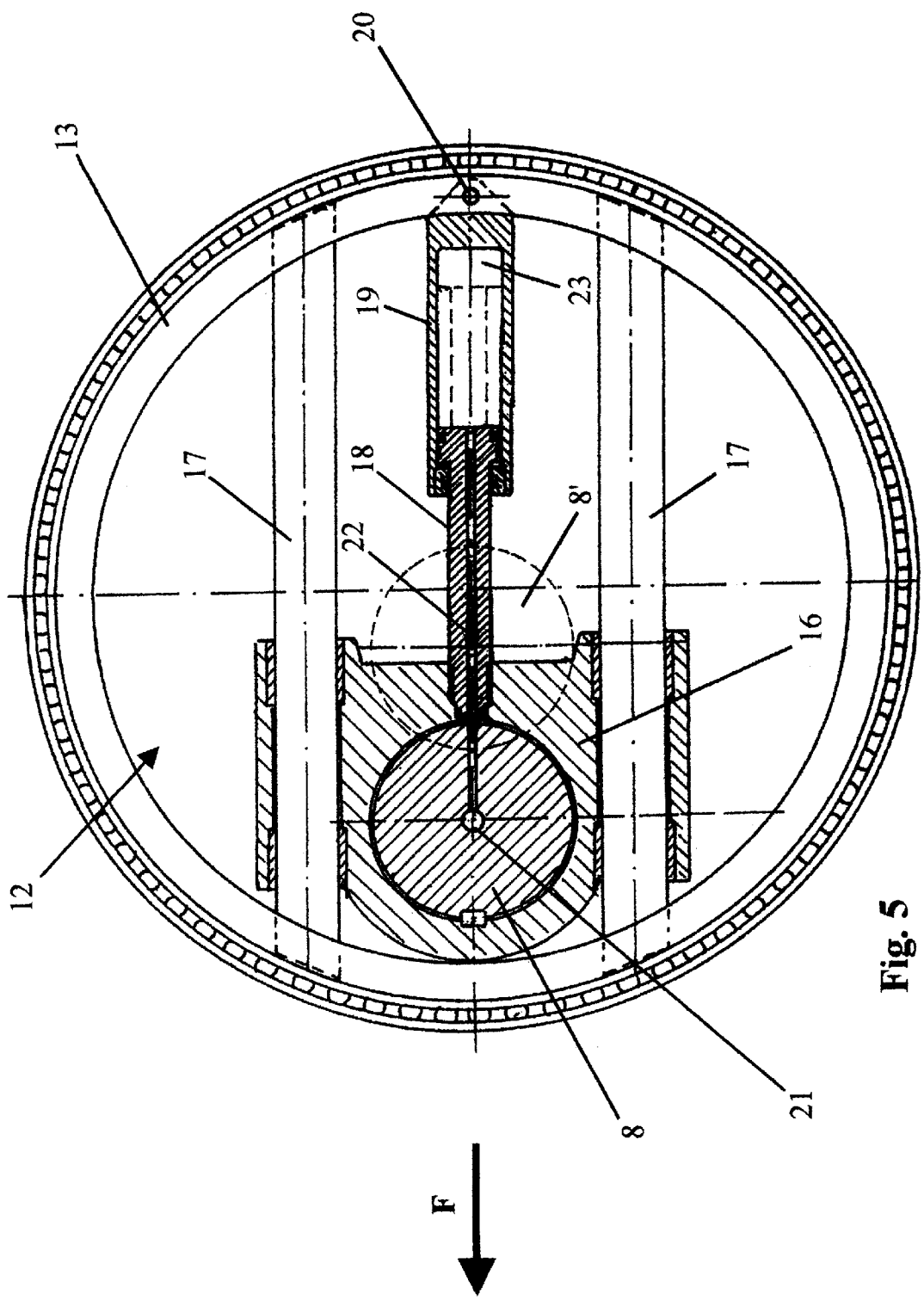
FIG. 5 shows a first preferred embodiment of the device in question (enlarged detail from FIG. 3)

The device according to the present invention, which allows tensioning of each single diamond-coated wire 2 in an independent manner, is achieved as described below. Each idle flywheel 4 (or the individual small flywheels 10, depending on the circumstances) is able to perform translatory movements relative and perpendicular to the shaft 8 on which it is rotatably mounted, respectively between an advanced position, where minimum tensioning of the wire 2 occurs, and a retracted position, where instead maximum tensioning of the wire 2 itself occurs. For this purpose, suitable tensioning means are provided. With reference to FIGS. 3 to 5, it can be noted that these tensioning means are housed inside an opening 12 which has very small dimensions and is substantially disk-shaped. This opening is located inside the central zone of the flywheel 4 and is delimited perimetrally, in the plane where the flywheel 4 itself Lies, by the internal rim of a ball bearing 13 onto which the flywheel 4 is keyed. Transversely with respect to this plane in which it lies, the opening 12 is delimited by two parallel surfaces (not shown) defined by the two opposite sides of the flywheel 4.

On the basis of this configuration, the opening 12 housing the "fine" tensioning means has a fixed position, relative to the rotational movement of the flywheel 4 about the shaft 8, i.e. the opening 12 and everything which it contains does not rotate.

With reference to the first preferred embodiment of the "fine" tensioning means (shown in FIG. 5), 16 denotes a sliding shoe which is integral with the shaft 8 and able to slide along parallel guides 17, the ends of which are fixed to the internal rim of the bearing 13.

The rod 18 of a hydraulic jack 19 which is hingeably mounted at 20 on the internal rim of the tearing 13 is fixed to the sliding shoe 16.

The hydraulic fluid under pressure is supplied from a central duct 21 formed in the shaft 8 and then passes, through the duct 22 formed inside the rod 18 until it reaches the chamber 23 of the jack 19.

On the basis of that described, it is obvious that the pressure of the hydraulic fluid causes translation of the sliding block 16 relative to the bearing 13. This results in the relative translation of the flywheel 4 with respect to the shaft 8 with the consequent (positive or negative) tensioning of the diamond-coated wire 2 mounted on that flywheel 4.

This obviously occurs for all the flywheels 4 arranged alongside one other. It should be noted that, owing to the extremely small dimensions of the opening 12 housing the tensioning device in question, it is possible to arrange the flywheels 4 even very closely alongside one another; this allows cuts to be performed on the stone block 1 which are very close to each other and thus obtain relatively small thicknesses of the slabs.

In FIG. 5, 8' denotes the position (shown in broken lines) of the shaft 8 where there is a certain forward movement of the flywheel 4 corresponding to a smaller degree of tensioning of the wire 2 compared to the position of the flywheel 4 with respect to the shaft 8, shown in continuous lines.

Figure 8:
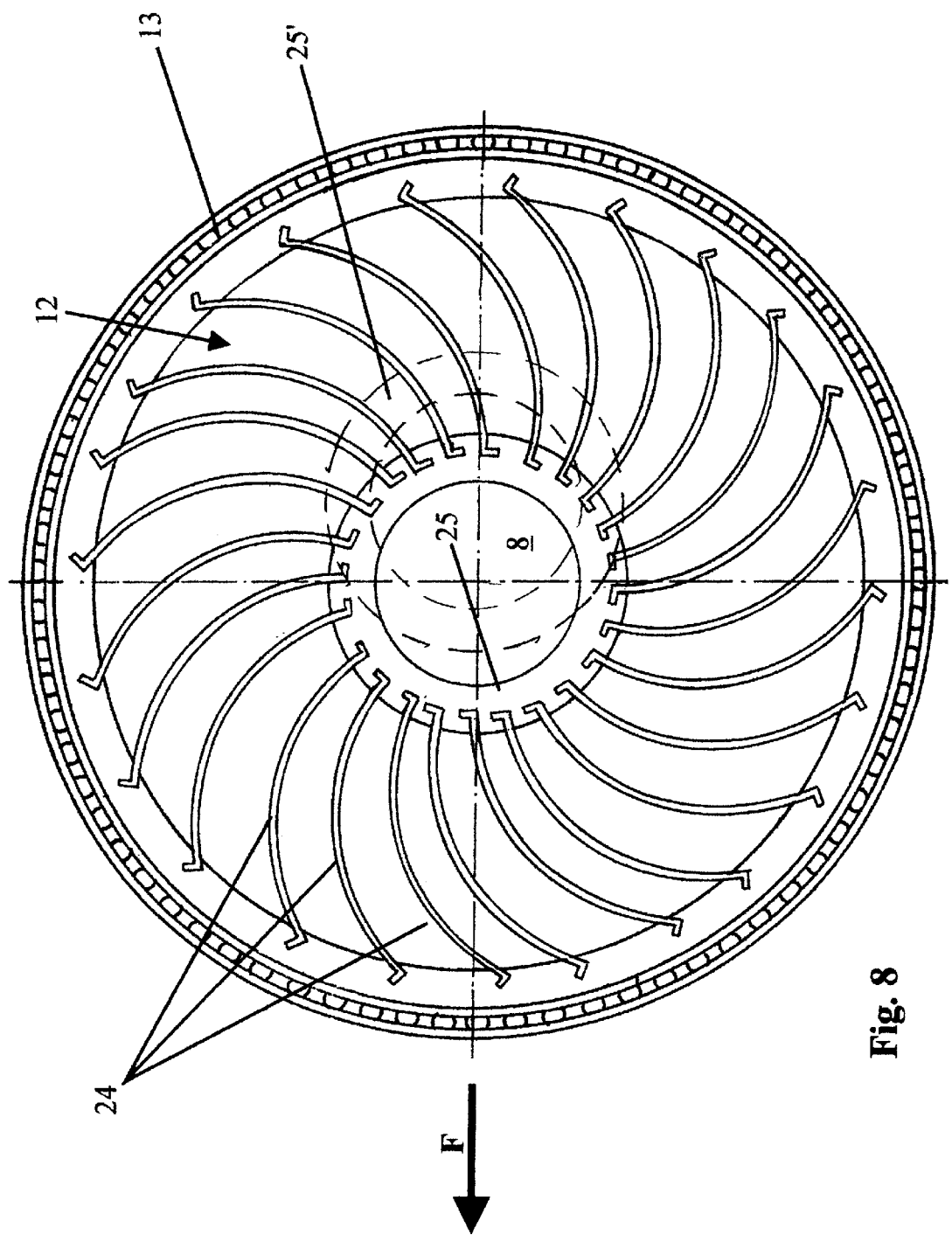
FIG. 8 shows a second preferred embodiment of the device in question (figure similar to FIGS. 5)

With reference to the second preferred embodiment of the "fine" tensioning means, shown in FIG. 8, 24 denotes elastic spokes formed by curved flexible rods which are fixed at their ends respectively to the internal rim of the bearing 13 and a circular bush 25 associated with the shaft 8.

In said FIG. 8, 25' denotes the position (shown in broken lines) assumed by the bush 25 when the flywheel 4 is located in a position further forwards with respect to the shaft 8. This configuration corresponds to a smaller degree of tensioning of the wire 2.

Figure 9:
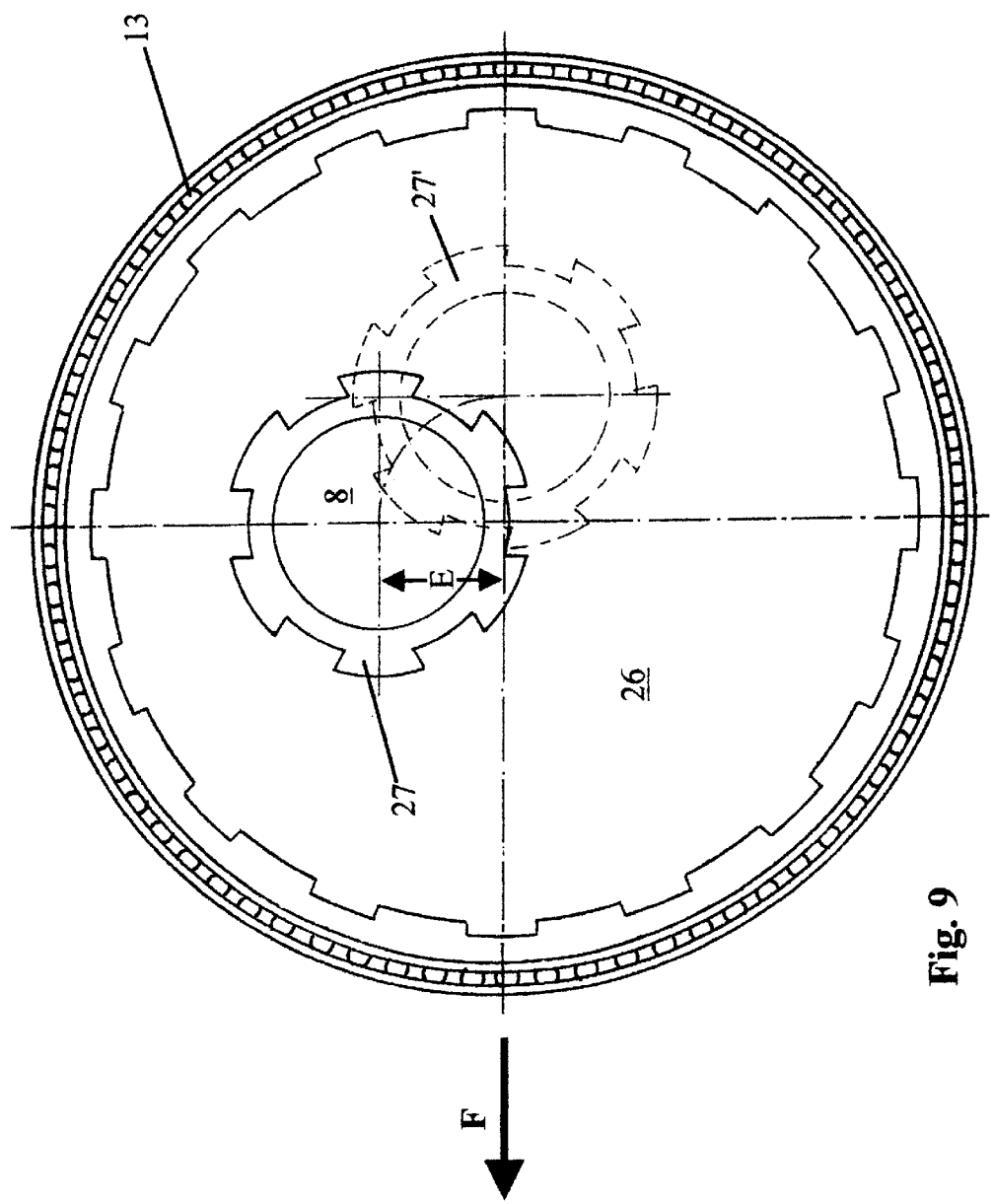
FIG. 9 shows a third preferred embodiment of the device in question (Figure similar to FIGS. 5 and 8).

FIG. 9 shows a third preferred embodiment of the "fine" tensioning means.

In this case they consist of an elastic plate-shaped element 26 (for example a circular sheet of rubber of suitable thickness) which is fixed perimetrally to the internal rim of the bearing 13 and affects almost the whole of the extension of the opening 12. A bush 27 located in an eccentric position with respect to the bearing 13 and fixed to the elastic element 26 is keyed onto the shaft 8. The eccentricity E is defined by the distance of the center of the bush 27 from the axis of the resultant of the tensioning forces (horizontal direction in FIG. 9).

In this way the translatory movements of the flywheel 4 relative to the shaft 8 (opposed by the elastic element 26 which forms the tensioning means) assume a rotational component. This is due to the generation of a torque during tensioning due to the eccentricity of the shaft 8 with respect to the bearing 13 in a direction transverse to the direction of the tensioning forces.

27' denotes (shown in broken lines) the relative position of the bush 27 with respect to the flywheel 4 when the latter is located in a position further forwards with respect to the shaft 8. This configuration corresponds to a smaller degree of tensioning of the wire 2 compared to the condition where the bush 27 is shown in continuous lines.

What is claimed:

1. A device for tensioning flexible elements wound onto pulleys, wherein a pulley (4) is able to perform translatory movements relative and perpendicular to a shaft (8) on which it is rotatably mounted, respectively between an advanced position, where minimum tensioning of a flexible element (2) associated with the pulley (4) occurs, and a retracted position, where maximum tensioning of the flexible element (2) occurs, tensioning means being provided in order to cause said translatory movements of the pulley (4) with respect to the shaft (8);

wherein said tensioning means are housed inside an opening (12) inside a central zone of the pulley (4), said opening (12) having a fixed position relative to the rotational movement of the pulley (4) about said shaft (8); and wherein said tensioning means comprise at least one sliding shoe (16) which is integral with the shaft (8) and which has, associated with it, at least one hydraulic jack (19) connected at one end to a bearing (13) and at the other end to the said sliding shoe (16), fluid under pressure being made to circulate inside the hydraulic jack (19) in order to cause relative translation of said sliding shoe (16) with respect to said bearing (13) which results in the relative translation of said pulley (4) with respect to said shaft (8).

2. The device as claimed in claim 1, wherein said sliding shoe (16) is able to slide along parallel guides (17) fixed at their ends to the said bearing (13).

3. The device as claimed in claim 1, wherein the fluid under pressure is connected to a chamber (23) of said hydraulic jack (19) by means of a first duct (22) passing through a rod (18) of said hydraulic jack (19), said first duct (22) being in turn hydraulically connected to a second duct (21) extending inside the shaft (8) from which the fluid under pressure is supplied.

4. A device for tensioning flexible elements wound onto pulleys, wherein a pulley (4) is able to perform translatory movements relative and perpendicular to a shaft (8) on which it is rotatably mounted, respectively between an advanced position, where minimum tensioning of a flexible element (2) associated with the pulley (4) occurs, and a retracted position, where maximum tensioning of the flexible element (2) occurs, tensioning means being provided in order to cause said translatory movements of the pulley (4) with respect to the shaft (8);

wherein said tensioning means are housed inside an opening (12) inside a central zone of the pulley (4), said opening (12) having a fixed position relative to the rotational movement of the pulley (4) about said shaft (8); and wherein said tensioning means consist of a plurality of elastic spokes (24) which are fixed at their ends respectively to a bearing 13 and to a bush (25) associated with said shaft (8).

5. The device as claimed in claim 4, wherein said elastic spokes (24) are formed by curved flexible rods.

6. A device for tensioning flexible elements wound onto pulleys, wherein a pulley (4) is able to perform translatory movements relative and perpendicular to a shaft 8) on which it is rotatably mounted, respectively between an advanced position, where minimum tensioning of a flexible element (2) associated with the pulley (4) occurs, and a retracted position, where maximum tensioning of the flexible element (2) occurs, tensioning means being provided in order to cause said translatory movements of the pulley (4) with respect to the shaft (8);

wherein said tensioning means are housed inside an opening (12) inside a central zone of the pulley (4), said opening (12) having a fixed position relative to the rotational movement of the pulley (4) about said shaft (8); and wherein said tensioning means consist of one or more elastic plate-shaped elements (26) which are perimetrally fixed to a bearing (13) and affect almost the whole of said opening (12), a bush (27) located in an eccentric position with respect to the bearing (13) fixed to said elastic elements (26) being associated with said shaft (8), said translatory movements of said pulley (4) relative to the shaft (8) therefore assuming a rotational component due to the generation of a torque during tensioning due to the eccentricity (E) of the shaft (8) with respect to the bearing (13).

7. The device as claimed in claim 6, wherein said elastic plate-shaped elements (26) consist of at least one rubber sheet.

8. A device for tensioning flexible elements wound onto pulleys, wherein a pulley (4) is able to perform translatory movements relative and perpendicular to a shaft (8) on which it is rotatably mounted, respectively between an advanced position, where minimum tensioning of a flexible element (2) associated with the pulley (4) occurs, and a retracted position, where maximum tensioning of the flexible element (2) occurs, tensioning means being provided in order to cause said translatory movements of the pulley (4) with respect to the shaft (8);

wherein said tensioning means comprise at least one sliding shoe (16) which is integral with the shaft (8) and which has, associated with it, at least one hydraulic jack (19) connected at one end to the said sliding shoe (16), fluid under pressure being made to circulate inside the hydraulic jack (19) in order to cause relative translation of said sliding shoe (16) with respect to a bearing (13) which results in said relative translation of said pulley (4) with respect to said shaft (8);

wherein said sliding shoe (16) is able to slide along parallel guides (17) fixed at their ends to the said bearing (13).

9. A device for tensioning flexible elements wound onto pulleys, wherein a pulley (4) is able to perform translatory movements relative and perpendicular to a shaft (8) on which it is rotatably mounted, respectively between an advanced position, where minimum tensioning of a flexible element (2) associated with the pulley (4) occurs, and a retracted position, where maximum tensioning of the flexible element (2) occurs, tensioning means being provided in order to cause said translatory movements of the pulley (4) with respect to the shaft (8);

wherein said tensioning means consist of a plurality of elastic spokes (24) which are fixed at their ends respectively to a bearing (13) and to a bush (25) associated with the said shaft (8).

10. The device as claimed in claim 9, wherein said elastic spokes (24) are formed by curved flexible rods.

* * * * *